W. H. BINGER.
CUTTER HOLDER.
APPLICATION FILED MAY 2, 1910. RENEWED SEPT. 9, 1912.
1,042,190.
Patented Oct. 22, 1912.
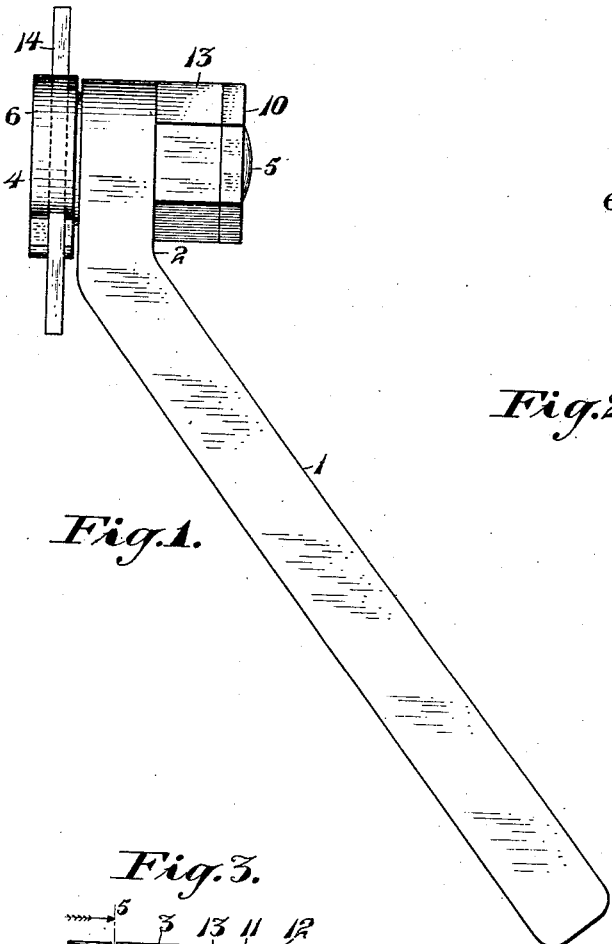
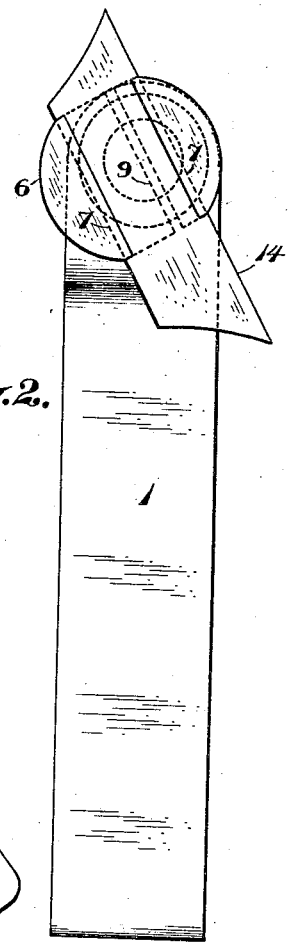
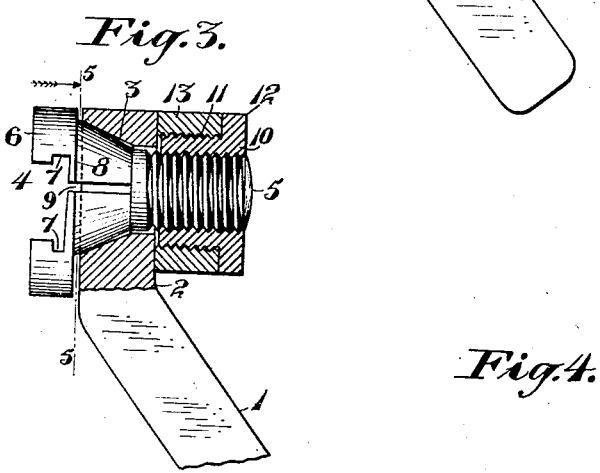
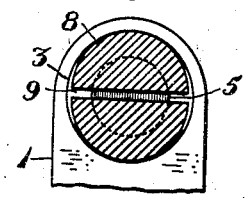
WITNESSES:
INVENTOR
Wm H. Binger,
BY
ATTORNEY

UNITED STATES PATENT OFFICE.

WILLIAM HENRY BINGER, OF SAN FRANCISCO, CALIFORNIA, ASSIGNOR OF ONE-HALF TO WILLIAM HENRY BURNETT, OF SAN FRANCISCO, CALIFORNIA.

CUTTER-HOLDER.

1,042,190.

Specification of Letters Patent.

Patented Oct. 22, 1912.

Application filed May 2, 1910, Serial No. 558,922. Renewed September 9, 1912. Serial No. 719,446.

*To all whom it may concern:*

Be it known that I, WILLIAM H. BINGER, a citizen of the United States, residing at San Francisco, in the county of San Francisco and State of California, have invented new and useful Improvements in Cutter-Holders, of which the following is a specification.

This invention relates to an improvement in cutter holders.

In using cutter holders of the present construction for cutting through a piece of metal or cutitng a groove therein, chips of the metal sometimes become lodged in the groove which is being cut, and thus present too great resistance to the movement of the cutter in the groove. Since the machine in which the cutter holder is itself held will not be arrested by this resistance thus created, it results in such case that, either the point of the cutter will break off, or the metal which is being cut will be moved out of position.

One object of my invention is to avoid this result, thus dispensing with the great care in overseeing the operation which is necessary in using the present forms of cutters.

A further object of the invention is to provide a cutter holder which will readily permit of the cutter being held at any desired angle with the work.

A further object is to provide a cutter holder which, without changing the body of the holder, can be used as a right or as a left hand cutter, as may be desired.

In the accompanying drawing, Figure 1 is a plan view of the cutter holder with the cutter therein; Fig. 2 is a side view of the same; Fig. 3 is a sectional view of the operating end thereof, certain parts being shown in side elevation; Fig. 4 is a side view of the inner nut; Fig. 5 is a cross section on the line 5—5 of Fig. 1.

Referring to the drawing, 1 indicates the stem of the holder, bent at its operating end, as shown at 2. Said end is formed with an opening 3, the greater portion of which is conical, and the remainder, at the smaller end of said conical portion, cylindrical. In this conical hole is received a clamp 4, which comprises a threaded stem 5, a clamp head 6 having under-cut grooves 7 to receive the cutter 14, and a conical neck 8, connecting said head with said stem. Said neck is divided into two parts by a slot or groove 9, lying between and parallel with the two under-cut grooves. Upon the end of the stem, the thread of which is a right-hand thread, is screwed a nut 10, having a left-hand external thread 11 and a flange 12. Upon the inner nut is screwed an outer nut 13 having a left-hand internal thread.

The angle of taper of the conical portion of the neck is greater than that of the hole, so that the conical surface of the neck does not touch the conical surface of the hole at all points thereof, but only at the widest portion thereof. Moreover the surface of the neck on a section taken at its widest portion, as shown in Fig. 5, is not in a true circle, but is reduced in diameter at the ends of the slit or groove 9. Consequently, when the clamp is pressed inward by the screwing of the nuts, as hereinafter described, the pressure on said clamp is only at points at the wider portion of the hole, and at the ends of a diameter at right angles to the slit or groove, that is, at points best adapted to press the two halves of the clamp toward each other to clamp the cutter therebetween.

In operation, the outer nut is screwed upon the inner nut but not so far that its end is in contact with the flange 12 of the inner nut. Then the inner nut is screwed upon the stem, care being taken that the outer nut turns with the inner nut, until the end of the outer nut impinges upon the cutter holder. The screwing of the inner nut upon the stem is continued until its flange 12 abuts against the outer end of the outer nut. Both nuts are then turned together, which has the effect of drawing the clamp inwardly into the hole 3, thereby pressing the two parts of the cutter holder together. The cutter holder will be held with sufficient firmness to overcome any ordinary resistance experienced in cutting. If, however, owing to the chips of the metal being cut becoming lodged in the groove, or for some other reason, an unusual resistance is offered in cutting the clamp will turn in the hole 3 and will thus avoid the breaking of the cutter or displacement of the work.

An important feature of this invention is that the cutter may be used either as a right or as a left hand cutter and the advantage above explained will be attained in either case. This is due to the fact that two nuts, respectively of right and left-hand threads, are used, one screwed over the other. By the use of inner and outer nuts of opposing threads, it results that when the screw is turned in the hole that nut will remain stationary which is so threaded in relation to the direction of turning the screw that it tends to unscrew. Thus if the cutter holder be in the position shown in Fig. 1, and the lower point of the cutter is cutting through the metal and meets with unusual resistance, the clamp is caused to turn so that the screw unscrews from the inner nut, and which remains stationary. If, however, the cutter holder is reversed and used as a left handed cutter then the rotary movement of the clamp due to an extraordinary resistance in the work would tend to screw the clamp into the inner nut. In that case, the inner nut would move with the screw and would unscrew within the outer nut, and the outer nut would remain stationary. Thus in either case the tendency is for the clamp to be released from the hole in which it is obtained.

It will readily be seen that the angle at which the cutter is held can be varied as desired.

I claim:—

1. A cutter holder comprising a stem, a clamp held thereby adapted to be rendered operative by motion in one direction with reference to said stem, and inoperative by motion in the opposite direction, said clamp having a threaded portion, an inner nut screwed upon said threaded portion and arranged when screwed thereon to move the holder longitudinally in the direction to render it operative and an outer nut screwed upon the inner nut, the inner and outer threads of the inner nut being right and left handed, substantially as described.

2. A cutter holder comprising a stem having a tapering hole, a clamp for the cutter having a tapering portion in said hole, and being formed of two parts adapted to be pressed together by a longitudinal movement in said hole, the end of the cutter holder being threaded, an inner nut screwed upon said threaded end and an outer nut screwed upon said inner nut, the internal and external threads of the inner nut being right and left handed, substantially as described.

In testimony whereof I have hereunto set my hand in the presence of two subscribing witnesses.

WILLIAM HENRY BINGER.

Witnesses:
FRANCIS M. WRIGHT,
D. B. RICHARDS.

---

Copies of this patent may be obtained for five cents each, by addressing the "Commissioner of Patents, Washington, D. C."